United States Patent
Burnett

(10) Patent No.: US 11,178,235 B2
(45) Date of Patent: *Nov. 16, 2021

(54) AGGREGATED SERVICE STATUS REPORTER

(71) Applicant: Capital One Services, LLC, McLean, VA (US)

(72) Inventor: Brian Burnett, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,548

(22) Filed: Jun. 24, 2020

(65) Prior Publication Data

US 2021/0258391 A1 Aug. 19, 2021

Related U.S. Application Data

(63) Continuation of application No. 16/793,244, filed on Feb. 18, 2020, now Pat. No. 10,735,530.

(51) Int. Cl.

| H04M 3/00 | (2006.01) |
|---|---|
| H04M 5/00 | (2006.01) |
| H04L 29/08 | (2006.01) |
| G06F 16/11 | (2019.01) |

(Continued)

(52) U.S. Cl.
CPC ............ *H04L 67/16* (2013.01); *G06F 16/128* (2019.01); *H04L 41/142* (2013.01);
(Continued)

(58) Field of Classification Search
CPC . G06F 16/128; H04L 41/142; H04L 41/5009; H04L 41/5032; H04L 43/0811; H04L 47/82; H04L 47/822; H04L 47/827; H04L 67/16; H04L 67/18; H04L 67/22; H04M 2215/78; H04M 2215/7846
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05,
(Continued)

(56) References Cited

U.S. PATENT DOCUMENTS

| 7,277,532 B2 | 10/2007 | Locke et al. |
| 8,613,089 B1 * | 12/2013 | Holloway ........... H04L 63/1458 726/23 |

(Continued)

OTHER PUBLICATIONS

Jul. 5, 2021—EP Extended European Search Report—App. No. 21157699.6.

*Primary Examiner* — Khai N. Nguyen
(74) *Attorney, Agent, or Firm* — Banner & Witcoff, Ltd.

(57) ABSTRACT

Systems as described herein may include generating an aggregated service status report for a real-time service delivery platform. A plurality of services running in a service domain may be determined. A request for a status of system behavior corresponding to a particular service may be received. Service connection details of the particular service may be discovered and metric data of real-time data movement may be tracked. Real-time snapshot aggregation of the particular service may be provided. In a variety of embodiments, a real-time system behavior report for the service across availability zones may be presented.

20 Claims, 6 Drawing Sheets

(51) Int. Cl.
    *H04L 12/24*  (2006.01)
    *H04L 12/911* (2013.01)
    *H04L 12/26*  (2006.01)

(52) U.S. Cl.
    CPC ........ *H04L 43/0811* (2013.01); *H04L 47/827* (2013.01); *H04L 67/18* (2013.01); *H04L 67/22* (2013.01); *H04M 2215/78* (2013.01); *H04M 2215/7846* (2013.01)

(58) Field of Classification Search
    USPC ............ 379/266.06, 266.07, 266.08, 266.09, 379/266.1, 309
    See application file for complete search history.

(56) References Cited

U.S. PATENT DOCUMENTS

| | | | | |
|---|---|---|---|---|
| 9,438,529 | B1* | 9/2016 | Kowalski | G06F 9/45558 |
| 9,960,952 | B2* | 5/2018 | Venkataraman | H04L 41/069 |
| 10,243,819 | B1* | 3/2019 | Chheda | H04L 41/0896 |
| 10,373,219 | B2* | 8/2019 | Middleton | H04L 67/10 |
| 10,440,180 | B1* | 10/2019 | Jayapalan | G06N 20/00 |
| 10,735,530 | B1* | 8/2020 | Burnett | H04L 47/82 |
| 2003/0076936 | A1* | 4/2003 | Locke | H04M 3/2218 |
| | | | | 379/112.01 |
| 2013/0051544 | A1* | 2/2013 | Ross | H04M 3/5232 |
| | | | | 379/265.02 |
| 2014/0269269 | A1* | 9/2014 | Kovvali | H04W 24/04 |
| | | | | 370/229 |
| 2015/0081883 | A1 | 3/2015 | Katz et al. | |
| 2016/0110782 | A1* | 4/2016 | Tadajewski | G06Q 30/0601 |
| | | | | 705/14.37 |
| 2016/0212266 | A1* | 7/2016 | Soundar | H04M 3/51 |
| 2016/0301584 | A1 | 10/2016 | Gehl et al. | |
| 2018/0288135 | A1 | 10/2018 | Narayan et al. | |
| 2019/0280950 | A1* | 9/2019 | Alshafei | H04L 41/0893 |
| 2019/0312974 | A1* | 10/2019 | Soundar | H04M 3/5183 |
| 2020/0053834 | A1* | 2/2020 | Dahan | H04L 43/08 |

* cited by examiner $ ./verify dacdgtl requestsproduce
6 of 6 in query response

RequestMetrics: Produce (Times are in ms)
network------>req Queue------>io threads
              |              page cache------>other brokers
              |              |              purgatory------>resp Queue------>network
              |              |              |              |              |

| id | stat | RequestQueue | Local | Remote | ResponseQueue | ResponseSend | Throttle | Total | RequestsPerSec |
|---|---|---|---|---|---|---|---|---|---|
| 1 | Min | 0.0 | 0.0 | 0.0 | 0.0 | 0.0 | 0.0 | 0.0 | |
| 1 | Max | 22.0 | 157.0 | 14234.0 | 326.0 | 302.0 | 1.0 | 14236.0 | 1m=31.1 5m=31.4 15m=30.4 mean=27.1 |
| 1 | Mean | 0.0 | 1.1 | 19.8 | 0.1 | 0.1 | 0.0 | 21.9 | |
| 1 | StdDev | 0.1 | 1.1 | 191.3 | 1.3 | 1.0 | 0.0 | 191.5 | |
| 2 | Min | 0.0 | 0.0 | 0.0 | 0.0 | 0.0 | 0.0 | 0.0 | |
| 2 | Max | 19.0 | 65.0 | 14144.0 | 121.0 | 77.0 | 2.0 | 14146.0 | 1m=30.1 5m=30.5 15m=29.8 mean=26.2 |
| 2 | Mean | 0.0 | 1.1 | 19.3 | 0.1 | 0.2 | 0.0 | 21.5 | |
| 2 | StdDev | 0.1 | 1.1 | 130.3 | 0.6 | 0.7 | 0.0 | 130.3 | |
| 3 | Min | 0.0 | 0.0 | 0.0 | 0.0 | 0.0 | 0.0 | 0.0 | |
| 3 | Max | 19.0 | 142.0 | 13801.0 | 287.0 | 95.0 | 16.0 | 13807.0 | 1m=30.5 5m=31.4 15m=30.6 mean=27.0 |
| 3 | Mean | 0.0 | 1.1 | 20.5 | 0.1 | 0.1 | 0.0 | 22.6 | |
| 3 | StdDev | 0.1 | 1.0 | 187.1 | 0.8 | 0.6 | 0.0 | 187.2 | |
| 4 | Min | 0.0 | 0.0 | 0.0 | 0.0 | 0.0 | 0.0 | 0.0 | |
| 4 | Max | 22.0 | 102.0 | 13055.0 | 145.0 | 84.0 | 3.0 | 13058.0 | 1m=30.3 5m=30.7 15m=29.8 mean=26.6 |
| 4 | Mean | 0.0 | 1.1 | 17.9 | 0.1 | 0.1 | 0.0 | 20.0 | |
| 4 | StdDev | 0.1 | 1.1 | 157.0 | 0.7 | 0.6 | 0.0 | 157.1 | |
| 5 | Min | 0.0 | 0.0 | 0.0 | 0.0 | 0.0 | 0.0 | 0.0 | |
| 5 | Max | 15.0 | 41.0 | 5530.0 | 101.0 | 73.0 | 1.0 | 5532.0 | 1m=30.0 5m=30.5 15m=29.6 mean=26.4 |
| 5 | Mean | 0.0 | 1.0 | 12.9 | 0.1 | 0.1 | 0.0 | 14.9 | |
| 5 | StdDev | 0.1 | 1.0 | 23.4 | 0.6 | 0.7 | 0.0 | 23.5 | |
| 6 | Min | 0.0 | 0.0 | 0.0 | 0.0 | 0.0 | 0.0 | 0.0 | |
| 6 | Max | 21.0 | 58.0 | 1400.0 | 77.0 | 34.0 | 20.0 | 1402.0 | 1m=30.4 5m=31.2 15m=30.3 mean=26.8 |
| 6 | Mean | 0.0 | 1.1 | 16.8 | 0.1 | 0.1 | 0.0 | 19.0 | |
| 6 | StdDev | 0.1 | 1.0 | 12.2 | 0.6 | 0.7 | 0.0 | 12.5 | |

AGGREGATED SERVICE STATUS REPORTER

CROSS-REFERENCE

This application claims priority to U.S. non-provisional patent application Ser. No. 16/793,244, filed on Feb. 18, 2020, now U.S. Pat. No. 10,735,530, entitled AGGREGATED SERVICE STATUS REPORTER, which application is hereby incorporated by reference herein in its entirety.

FIELD OF USE

Aspects of the disclosure relate generally to big data specifically to the monitoring and management of cloud-based streaming data resources.

BACKGROUND

In a service delivery platform with real-time streaming data architectures, numerous data producers and data consumers may perform reads and writes simultaneously. The server delivery platform may contain service domains with multiple servers in data centers across distinct geographical areas with replications to keep them synchronized. Servers may be added to or removed from the service domains at any given time. Conventional systems attempt to dump server metric data into persistent stores and query the data for server status. However, due to the overwhelming size of the metric data and the lack of the capability to dynamically discover the servers, these systems fail to provide system wide insights into the servers, services or domains within reasonable response times. In addition, such persistent stores may not have a sophisticated aggregation process that application logics may need to be built on top of the queries, thereby limiting its ability to provide an accurate system wide status from top down into the subcomponents.

Aspects described herein may address these and other problems, and generally improve the flexibility, efficiency, and speed of processing metric data to offer insights into the details of the real time streaming data platform and aggregated service status.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include providing an aggregated service status report for a real-time data streaming platform. A real-time data streaming system may include a plurality of services running in a service domain, where each service may be running in a plurality of availability zones of the service domain in geographically distinct regions, and where each service may be associated with a plurality of server instances. A request for a status of system behavior corresponding to a particular service may be received. Service connection details of the particular service may be discovered using tags mapping to the plurality of server instances associated with the particular service. Based on the service connection details, metric data of real-time data movement between producers and consumers associated with the particular service may be tracked. In a variety of embodiments, the system may provide real-time snapshot aggregation of the particular service based on the service connection details and the metric data of real-time data movement. Accordingly, based on the real-time snapshot aggregation, a real-time system behavior report may be presented for the particular service across the plurality of availability zones.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 5 shows an example aggregated service status report according to one or more aspects of the disclosure; and FIG. 6 shows a shows an example aggregated service status report according to one or more aspects of the disclosure.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for providing aggregated service status report for a real-time data streaming platform. The service domain may include mirror systems across multiple availability zones and real-time data may be replicated among the mirror systems across the availability zones. The aggregated service status reporting system may collect real-time system behavior associated with the mirror systems.

The aggregated service status reporting system as described herein allow for dynamic discovery of the server instances associated with the service domain. Prior to discovering the service connection details of a particular service, the system may generate a plurality of tags corresponding to the server instances associated with the service domain.

In many aspects, raw metric data of a collection of attributes and properties may be collected corresponding to the service instances associated with the particular service. The collected raw metric data may be filtered out based on the server instances and a type of the service domain. One more brokers may be associated with the particular service. Statistics may be collected on real-time data movement for the one or more brokers and data channels that the one or more brokers write data to achieve parallelism.

Aggregated Service Status Reporting Systems

Figure 1:
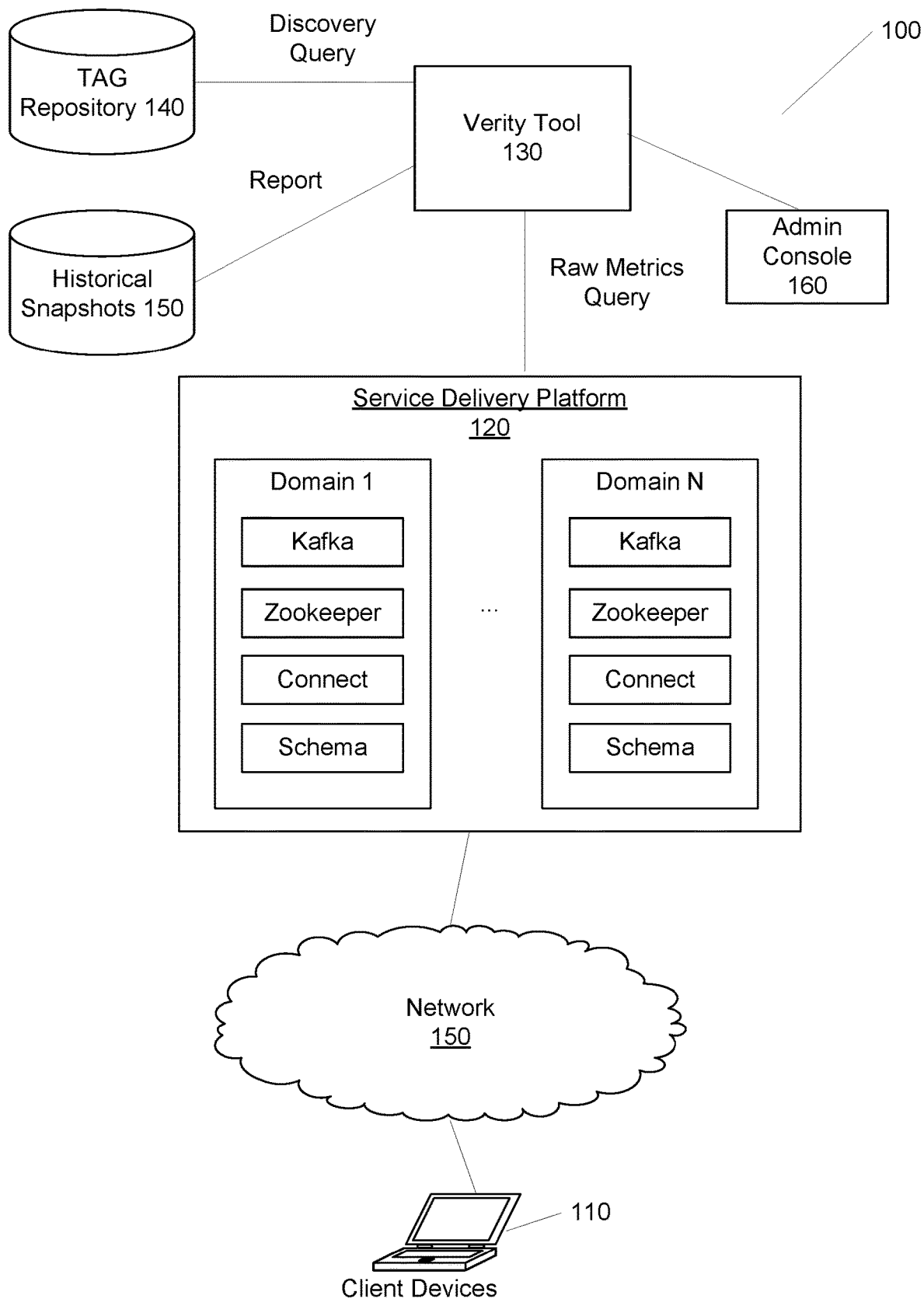
FIG. 1 shows an example of a system for providing aggregated service status report for a real-time data streaming platform in which one or more aspects described herein may be implemented.

FIG. 1 shows an aggregated service status reporting system 100. The aggregated service status reporting system 100 may include at least one client device 110, at least one service delivery platform (SDP) 120, at least one verity tool 130, at least one TAG repository 140, at least one historical snapshots 150, and at least one admin console 160. The client device 110 may be in communication via a network 150. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may read or write real-time streaming data from/to service delivery platform 120. At any given time, there may be thousands of user cases—e.g. some client devices may stream video data from the SDP; some client devices may send credit card transactions to the SDP; and some client devices may send authentication information to SDP for security enforcement. Service delivery platform 120 may include domains 1, 2, . . . N and each domain may contain a plurality of services. Service delivery platform 120 may stream real-time data that may be dynamically growing and expanding when new server instances are added to the domains or dynamically shrinking when some server instances are removed from the domains. A domain or a cluster may be applied to a Line of Business (LOB) and/or a LOB may have more than one domains.

In the example illustrated in FIG. 1, domain 1 and domain N each has four types of services: a Kafka service, a Zookeeper service, a connect service, and a schema service. These four types of services are for illustration purpose, and it may be possible for each domain to have other types of services. It may be also possible that each domain 1 to N may have different types and numbers of services. Each service domain may contain an arbitrary number of server instances.

Kafka may be a service used in real-time streaming data architectures to provide real-time analytics. Kafka service may be part of an ecosystem that may allow the customers to produce and consume data in real time, and process real-time streams of data across multiple geographic regions. Zookeeper may be a service that allows for election of a leader among the server instances upon the service starting up, and store users' account credentials and the metadata of the streaming data. Zookeeper may further act as a centralized service and may be used to maintain naming and configuration data and to provide flexible and robust synchronization within distributed systems. Zookeeper may keep track of status of the server instances of the Kafka service and Kafka topics, partitions etc. Zookeeper may allow multiple clients to perform simultaneous reads and writes and may act as a shared configuration service within the system and issue orderly updates.

Connect service may be an open source product that manages data replication among domains in data centers across geographic regions. A domain may include mirror systems for example, in East Coast region and West Coast region. Connect server may keep mirror systems of the domain synchronized, manage data replications between the East region and the West region, and maintain connectivity and data movement between regions. Schema or schema-registry service may be tied to data government process that may facilitate schema validation, and store the schemas in the repository. When the consumer or producer initiates an interaction with a topic, the schema service may retrieve a schema from the repository and apply to the data stream either being written or read.

Verity tool 130 may connect to service delivery platform 120, monitor the health of these services in the domains. Verity tool 130 may run raw metrics queries, collect metric data associated with the server instances, services and the domain, and provide system wide snapshots into individual server, service, and/or domain. Verity tool 130 may connect to TAG repository 140 and run discovery queries to identify the specific server instances associated with a domain. A domain or a cluster may have a number of instances across data centers and high availability zones in the East and West regions. In some examples, as these server instances may be recycled every 30 or 60 days, it may be difficult for a conventional system to keep track which instances belong to which cluster. Verity tool 130 may run the discovery queries to TAG repository 140 to get specific information for the cluster, to specify and construct the connection streams to all the server instances associated with a cluster or domain. Verity tool 130 may then make requests to the metrics data to each of the connection pool, and aggregate the result to provide system wide snapshots to the cluster or domain.

Verity tool 130 may isolate the traffic to the correct service and/or filter out other service type and domain. For example, the system may resize the domain with six brokers automatically. An admin console 170 may be connected to verity tool 130. An administrator may issue commands via the admin console 170 to filter out the traffic by service type, such as a Kafka service, and specify the domain or cluster name of interests. As the new server instances may be added to the cluster or old instances may be removed from the cluster, before running the discovery query, the system may be agnostic to the information whether the cluster may contain 6 or 12 server instances or brokers. Verity tool 130 may run the queries and discover the server instances. Verity tool 130 may aggregate and present system wide metric data depending on the server status in real-time. Verity tool 130 may provide a view of the individual status of each server instance, but that may not be very useful in terms of a system of services. Instead, verity tool 130 may collect the current relevant raw metric data and aggregate the data in a manner that allows real-time snapshot views of a system as a whole.

Verity tool 130 may also connect to historical snapshots database 150. To create and persist data streams from any point in time, verity tool 130 may pull historical data from historical snapshots database 150 to present, for example, historical data from a month ago, associated with a particular domain. In the event that verity tool 130 identifies that there was a 10 second latency between brokers at the time vs. a 20 second latency now, the administrator may start to investigate what may happen between a month ago and now based on the system wide snapshots and difference in latencies over time.

The aggregated service status reporting system 100 may be associated with a particular authentication session. The aggregated service status reporting system 100 may store a variety of streaming data, aggregate and present metrics data as described herein. However, it should be noted that any device in the aggregated service status reporting system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in aggregated service status reporting system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the aggregated service status reporting system 100 in front of one or more computing devices such that any external devices may communicate directly with the specialized hardware.

Computing Devices

Figure 2:
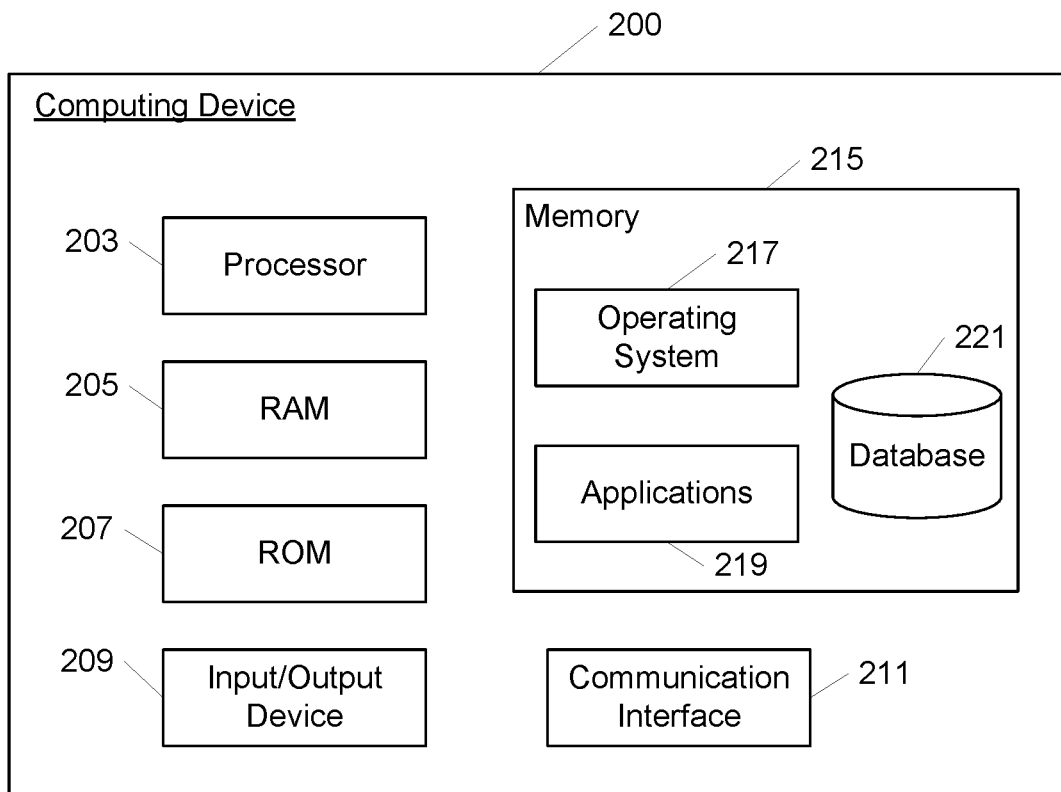
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Real-Time Service Delivery Platform

Figure 3:
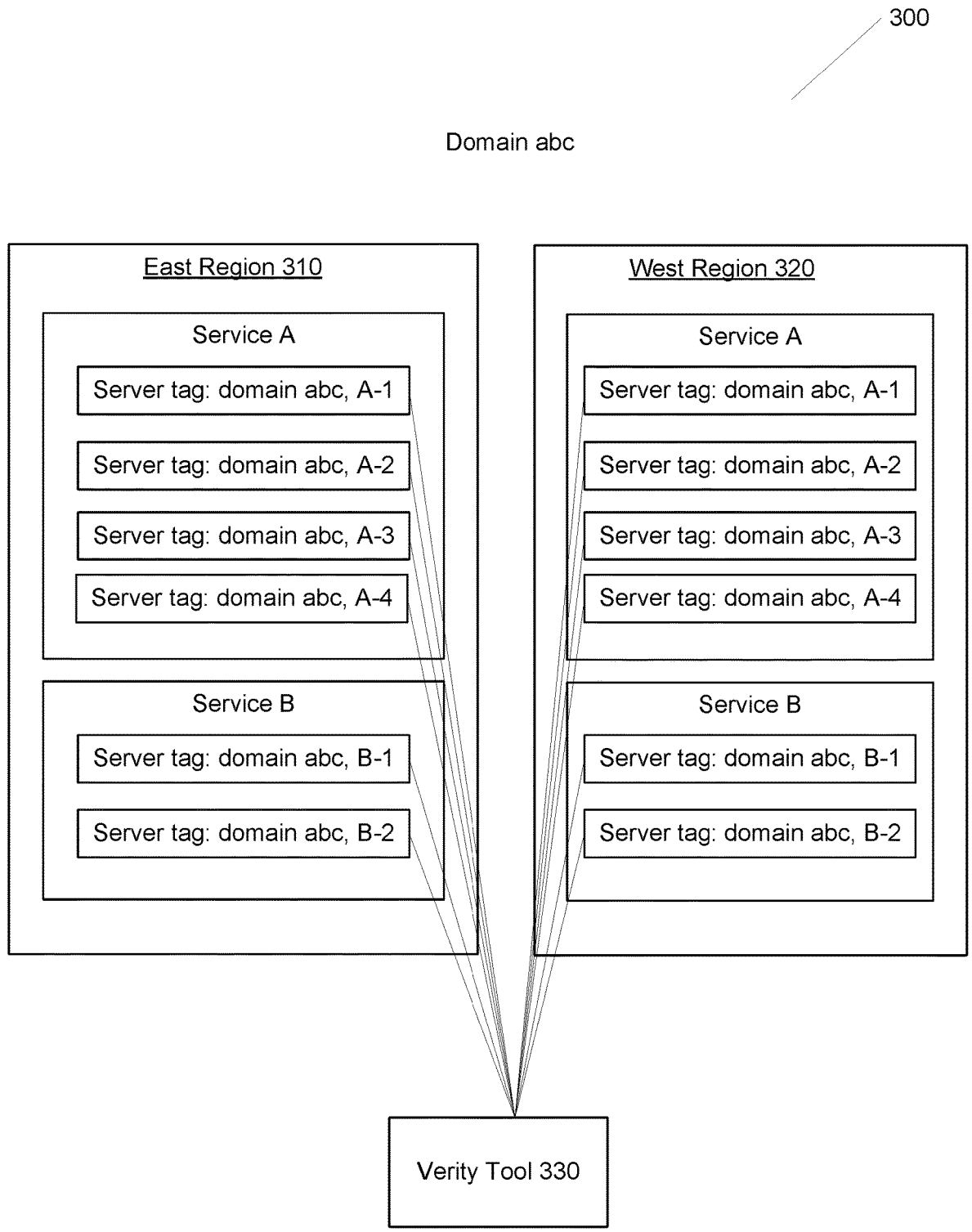
FIG. 3 is an example of a real-time service delivery platform in accordance with one or more aspects described herein.

FIG. 3 illustrates an example service domain in a real-time service delivery platform that the verity tool may interact. System 300 may include domain abc, which may across data centers in east region 310 and west region 320, and verity tool 330. In each region, domain abc may include two services, service A, such as a Kafka service and service B, such as a Zookeeper service, respectively. It is possible that domain abc may include additional services in each region. System 330 may contain mirror systems across the plurality of availability zones, such as the east region and the west region. Data content may be replicated among the mirror systems across the plurality of availability zones. For example, for services A and B, data content may be replicated between the east region and the west region.

There may be four server instances configured for service A at the east region. For example, these four server instances may have the server tags: domain abc, A-1, domain abc, A-2, domain abc, A-3 and domain abc, A-4. Service B in the east region may have two server instances; domain abc, B-1 and domain abc, b-2. The number of server instances for each service may be arbitrary and may be dynamically growing or shrinking over time. The server tags may be stored in a tag repository and updated as new server instances joined the cluster, or old instances decommissioned from the cluster. System 300 may use Amazon Web Service (AWS) cloud tags or any tagging system pluggable to the backend. The tagging system may facilitate the server discovery process as the services may contain any arbitrary numbers of servers. Verity tool 330 may query the tag repository to obtain the latest configuration information and determine which servers to monitor for a specific domain.

Verity tool 330 may establish a connection pool with each of the server instance for a service or a cluster in a geographic region for a domain. Verity tool 330 may run queries via the connection pool to obtain raw metrics data from each server instances.

System 300 may be a complex system of real time data movement between various producers and consumers of data content and the data content may be moved across regions for geo-redundancy. Verity tool 330 may take a snapshot of service metrics for any component in the domain and may aggregate the metrics data to present a holistic view of the system behavior. The system administrator may select from any arbitrary view and the metrics data may be filtered by specific domain types and inserted into table formatted presentations. The aggregated snapshots may be persisted in long term storage such as a relational database, such as a historical snapshots database, to enable the reconstruction of the historical views upon request. A presentation and the filters may be mapped together by a context name, and future presentations may be readily created as new services or raw metrics data becomes available.

Aggregated Service Status Reporting

Figure 4:
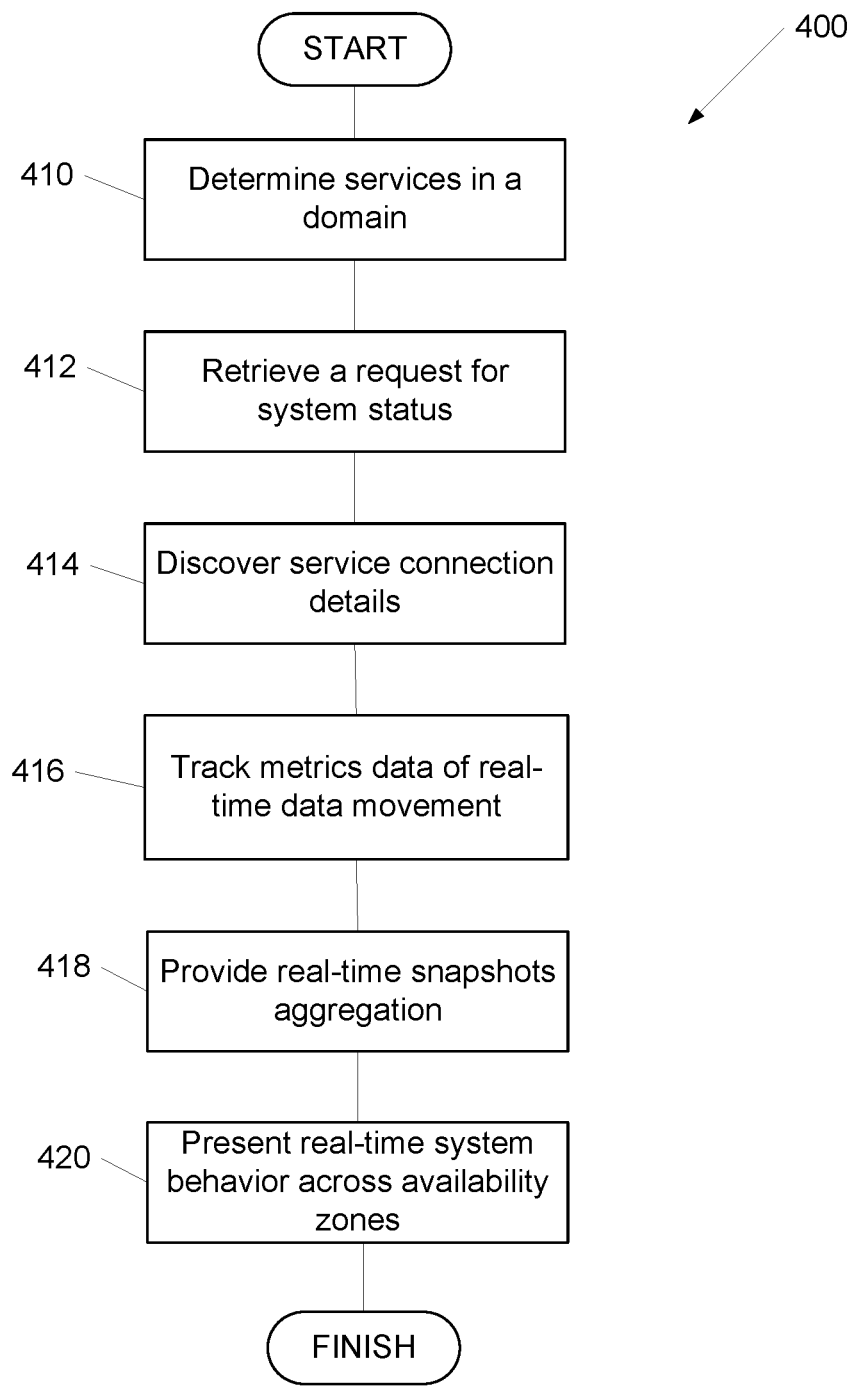
FIG. 4 shows a flow chart of a process for providing aggregated service status report for a real-time data streaming platform according to one or more aspects of the disclosure.

An aggregated service status reporting systems may generate a system wide snapshots and offer insights into holistic system behaviors. FIG. 4 shows a flow chart of a process for providing aggregated service status report for a real-time data streaming platform according to one or more aspects of the disclosure. Some or all of the steps of process 400 may be performed using one or more computing devices as described herein.

At step 410, a plurality of services running in a service domain may be determined. Each service may be running in a plurality of availability zones of the service domain in geographically distinct regions, and each service may be associated with a plurality of server instances. A service delivery platform may be dynamically expanding or occasionally shrinking at any given time. A service delivery platform may include multiple service domains, domains, and/or clusters. A domain or a cluster may correspond to a LOB, and a LOB may have more than one domain. Each domain may run multiple services corresponding to numerous server instances running across availability zones. For example, there may be 15 domains in the east region, and another 15 domains in the west region, which may serve as a mirror system for the east region. In these mirror systems across the plurality of availability zones, data content may be replicated among the mirror systems across the plurality of availability zones.

A domain may run services that are known products on the market supporting data flows of all lines of business. Each region of high availability zones may have different types of services such as Kafka, Zookeeper, connect, and schema services. Other types of services may also be possible. Each service may be hosted on any arbitrary number of server instances. Each server instances may be polled for statistical metrics data. By taking the metrics data collectively from the services, the system may offer a view into what the services may be doing in a specific context, and in a particular time in aggregate. The system may generate a real-time system behavior report that may reflect real-time system behavior associated with the mirror systems.

These services in the domain may manage real-time streaming data. The services may move data for the clients, which may be either producers or consumers of the data, across multiple data centers and regions. A series of server instances may act together at a service across multiple data centers in separate regions, and the service hosted at mirror systems are synchronized. The metrics data in aggregation may offer information such as health check to ensure system loads and system resources may not be exceeded, to understand peak of data and time of the day when the system may be heavily utilized, and other times when data may get in the intermittent state across data centers and regions.

At step 412, a request for a status of system behavior may be retrieved. A system administrator may issue a command via an admin console and request such information from the verity tool. For example, a system administrator may use the following command line options to invoke verity tool to obtain a status of system behavior corresponding to a particular service:

usage: java-cp sdp-verity.<Ver>.jar sdp.verity-cluster<c>-region<e|w>-env<d|q|p>-role [kafka|connect|zookeeper-|schemaregistry] [-domain <d>|-format <f>] [filterKV k=v[,v2][:k2=v[,v2]]] [filterType type]

Where -domain<d> will dump raw data and -format <f> will dump formatted screens filterKV: takes multiple filters separated by ':' and each key can take multiple values separated by ',' filterType: takes multiple types separated by ','. Types can be from different domains To limit some output:

domain<d> (use -filterType <type1[,type2]> with no spaces between types format <f> (use -filterKV key=value1[,value2] [key2=value1[,value2]]> with no spaces between keys)

Note: If -domain or -format is not provided or if the format is not valid then all raw metrics for the role are dumped.

format options
    ===JMX===
    domains:list JMX domain names
    types:list JMX domain names and types
    canonical:raw metric dump with canonical mbean name
    ===—role kafka===
    system—metrics related to server operation
        os:os level JVM metrics (heap, file handles, etc.)
        network:broker network processor stats
        application:app-id and BrokerState metrics
        logcleaner:LogCleanerManager, LogCleaner and LogFlushStats stats
    broker<x>—Shows BytesIn|Out distribution for the broker and each topic
        broker1:BrokerTypeMetrics 1 minute stats
        broker5:BrokerTypeMetrics 5 minute stats
        broker15:BrokerTypeMetrics 15 minute stats
        brokermean:BrokerTypeMetrics mean stats
        brokeronly1:BrokerTypeMetrics 1 minute stats for brokers only
    requests<x>—Shows the time requests spend moving through queues and interfaces
        requestsproduce:RequestMetrics for producers
        requestsconsume:RequestMetrics for consumers
        requestsfollower:RequestMetrics for replica followers (between brokers)
    replicas—Shows the partition and leader counts per broker with detailed IO stats
        replicas:ReplicaManager stats, Leader, Partition and UnderReplicated counts
    general—Basic reporting formats
        offsets:Log metrics—start/end offset and log segment sizes
        partitions:Partition replica assignment
        produce:byte and throttle rates by producer client-id
        fetch:byte and throttle rates by fetcher client-id
        request:request time and throttle rates by request client-id
    ===—role connect===
    connect—Show detailed connect-replicator stats
    connect:System level metrics
    connectproducer:Producer detailed metrics
    connectproducermetrics:only the producer-metrics section
    connectconsumer:Consumer detailed metrics
    connectconsumermetrics:only the consumer-metrics section
    connectconsumerfetch:only the consumer-fetch-manager-metrics section
    connectconsumertopics:consumer-metrics sorted by topic with totals
    connectconsumerlag:only the consumer fetch lag stats
    connectconsumerlagonly:only the lag values greater than zero
    ===—role zookeeper===
    zkniometrics—Show detailed xookeeper nio stats
    ===—role schemaregistry===
    sregjettymetrics—Show detailed sreg web server stats The options listed above on the command line are for illustration purpose only, and other options may be possible. Alternatively, an admin console may include the options that may provide the user interface (UI) or user experience (UX) to assist administrators with a visual tool to select which regions, services, filters and presentation format that are desired. The admin console may also be instructed to pull persisted metrics or live or both and present the deltas. Since command line options may be complex, there may be benefit to have a UX that may reduce the amount of effort to get the desired presentation. For example, there are four roles defined for the services which may be presented as options on the admin console or via command line: Kafka, connect, Zookeeper and schema (or schema registry), and it is possible to include other types of the roles for the services in the domains. In some examples, the domains may be defined to include JMX domain names and types. However, the domains may not be limited to JMX domains and other mechanisms to supply the raw metrics data and other types of domains may be possible.

At step 414, service connection details may be discovered. The verity tool may discover the connection details of the particular service using tags mapping to the plurality of server instances for the particular service. The verity tool may query the TAG repository to obtain server tags such as abc, A-1, domain abc, A-2, domain abc, A-3 and domain abc, A-4. Service B in the east region may have two server instances; domain abc, B-1 and domain abc, b-2. As the number of the server instances may change dynamically for the services, the TAG repository may be kept up to date as new server instances being added to the domains and obsolete server instances being decommissioned from the domains over time. In some examples, prior to discovering the service connection details, a plurality of tags corresponding to the server instances may be generated for the service domain. Based on the retrieved information from the TAG repository during the server discovery process, the verity tool may identify in real-time, the names of the server instances configured for a specific domain, and the availability zones or regions that the server instances may reside. The verity tool may open connection pools to each of the server instances discovered for the particular domain.

At step 416, metric data of real-time data movement may be tracked. Based on the service connection details, the verity tool may track the metric data associated with the real-time data movement between producers and consumers associated with the particular service. The service delivery platform may be a complex system of real time data movement between various producers and consumers of data content. The producers and consumers may move the data across regions for geo-redundancy. The verity tool may take a snapshot of any component in the service metrics and aggregate the snapshots to presents a holistic view of the system behavior.

In the service delivery platform, a topic may be a name for a number of channels for the producers to write data to achieve parallelism, or for the consumers to retrieve large amount of data via these channels. At any given time, the producers may produce data via a collection of channels, which may be stored across many partitions. An end user may write data across many partitions for that one topic. There may not be a task to reconstruct the data flow, to drill down from the perspective of the topic, and/or to examine the details on pushing the data crossing each partition and server. Given that the data load may across entire service, for example, 12 partitions, it may be difficult to go through all these 12 servers, from the perspective of the topic, to identify the data load that may be responsible for this topic. All these 12 individual servers may be responsible for 0-N pieces of that data load related to the specific topic. As such, the individual element of the metrics data may not provide any real knowledge to the data load attributed to the topic.

The verity tool may gather these individual elements, return the results to the tool, while waiting for all individual servers to return the raw metrics data. The verity tool may put the raw metrics data in a complex data structure, which may be identified by the host ID, classification of data type, break down and pass through any type of filters specified by the admin via command line, and pass to the viewer for a screen formatted data presentation.

For example, the service delivery platform may stream video content to multiple consumers. The consumers may stream across multiple partitions in parallel via the data channels of the topic to get throughput, while there may be 10 or 100 partitions depending on the volume of the traffic. A producer may generate a massive amount of data to send in real-time, to any number of consumers who may be interested in. A topic may be the name given to a number of parallel channels to push this data in using a domain service, such as a Kafka service.

In a variety of embodiments, the service delivery platform may have more consumers than producers, as consumers may collect data from any point in the data stream. Data may be in the stream for predefined period of time, such as a week, for a short period of time, such as a minute, or may be there indefinitely. Consumers may read the data, turn around read the data again, or go to particular point in the stream and read from there. Various consumers may follow that pattern in a time series, so they may consume and re-consume every hour, and the consumers may hold the state in their own applications, rebuild and collect the information again back from store, and they may not need to maintain consistent state before doing another data point (such as making a purchase). The consumer side may be usually much busier than the producer side. The producer may be resource intensive on the file systems and network heavy, because that may be the location where data being ingested. Conversely, the consumer side may be typically more network heavy, as data being read and put on the network.

In a variety of embodiments, the verity tool may determine a first set of producers and consumers associated with a first availability zone of the particular service. The verity tool may determine a second set of producers and consumers associated with a second availability zone of the particular service, where data content may be replicated across the first availability zone and the second availability zone for geo redundancy. The verity tool may collect metric data in a time series related to the first set of producers and consumers, and the second set of producers and consumers, where data may be moved through queues and interfaces. Based on the collected metric data, the verity tool may track the metric data related to the real-time data movement between the first set of producers and consumers and the second set of producers and consumers.

At step 418, real-time snapshot aggregation may be provided. Based on the service connection details and the metric data of real-time data movement, the verity tool may generate real-time snapshot aggregation for the particular service. The verity tool may collect raw metric data including a collection of attributes and properties corresponding to the server instances associated with the particular service. The verity tool may filter out the collected raw metric data based on the server instances and a type of the service domain. For example, the verity tool may filter out the collected raw metric data based on a role, such as a replicator, a central service managers, a schema registry, a Kafka service, and/or a Zookeeper service.

The verity tool may provide a view into the server instances in aggregate at any given time: the amount of real-time streaming data going through each partition and/or the movement of replica copies of the data in the mirror systems. The verity tool may track how much data travel through each replica and provide insights as whether they are synchronized or they falling behind. The verity tool may further provide information on what is the in-rate per interval, for example, 1, 5 or 10 minutes; how many producers/consumers are connected to which systems at any given time and the status of each of the producers and consumers. The verity tool may also check status of the data flow across regions, whether data is replicated to the redundant geo regions, whether replication is synchronized or lagging behind, and how far the replication may be lagging behind.

In a variety of embodiments, the verity tool may collect raw metrics data in real-time, for example, through JMX data source. Consumers of data may conduct a number of tasks: some consumers may stream video data, some consumers may send a credit card transactions, and some consumers may send authentication information or log for security verification. The replication of this real-time data may be moving from one region to another. At any given time, there may be thousands of use cases active in the service delivery platform. The verity tool may have the ability to isolate the load to individual user case and shed lights into how each user case may interact with the entire system collectively and individually.

At step 420, a real-time system behavior report may be presented. Based on the real-time snapshot aggregation, the verity tool may present a real-time system behavior report for the particular service across the plurality of availability zones.

In a variety of embodiments, presenting the metric data in aggregate may offer further insights into the system wide behaviors. In the event that the metrics data shows there is no lagging at a first server instance with little data load, while another server is extremely busy with large amount of data. This may indicate there may be lagging occurred at the first server. The administrator may not be able to identify that a service itself is having any issues, unless the administrator examines collectively at each of these individual server together for information such as the distribution of the load among servers, which server accounts for what data volumes, the utilization of the system resource, and whether the data flow is network or CPU bound.

In a variety of embodiments, the verity tool may obtain metrics data related to activities to a website. The metrics data may correspond to logs from various end points including user devices, network ties, computing instances, and the collection of logs passing through the service delivery platform.

There may be security settings associated with the end user topics, which may need the end users go through registration, and obtain credentials, and access permissions. In the example of financial data, the data set may be registered with the government for compliance reasons, so that the system may be aware what data set is coming to the system. In a variety of embodiments, the verity tool may view data flow associated with a user based on credentials such as a group ID. The metrics data may be viewed at an application level or a service level. Though the isolation of the data flow by access permissions, verity tool may offer snapshots into the data flow for user or user groups even when they may not be connected to the system. For example, there may be 500 subscribers to the service delivery platform and only 100 subscribers may be currently connected to the platform. The verity tool may provide details of the data flow using application ID or group ID. Notably, the verity tool may examine metrics data related to data flow through the system, not at the data content itself.

The verity tool may consider numerous parameters obtained from the metrics data. In a variety of embodiments, from perspective of throughput, the verity tool may consider an "offset" parameter. As data is being persisted through the service, each individual server instance may get an offset, which may be a pointer written in the commit log. The offset may provide information such as: what is the offset a topic is left off, and the point at which data has been streamed. Tracking the point of the offset may indicate how fast an offset is being written, how big the data segment related to the offset may be. By looking at collectively where the offsets are, the verity tool may obtain information on how much data may live in a particular topic and system wide behavior report.

The verity tool may present the real-time system behavior report based on the command line options selected by an administrator. FIG. 5 shows an example real-time system behavior report according to one or more aspects of the disclosure. As illustrated in FIG. 5, an administrator may run a command "./verity dacdgt1 requestsproduce" to generate this report, where "dacdgt1" may be the domain name, and "requestsproduce" may be a shortcut for mapping a service, filter and format. The screen shot shows that for this particular service in a partition, such as a Kafka service, may have six servers, as indicated by the first column id 1-6 in the table. For example, these six servers may be discovered by the verity tool using server tags associated with the service and domain.

The screen short further displays a representation of various steps in the data flow process in time series, as indicated in the headings of the table as: network, request queue, I/O threads page cache, other brokers purgatory, resp queue and network. The streaming data may be initially unpacked from the network, and put in the request queue. There may be a possibility that the request queue may be backed up if sending too much data through the request queue. Next, the data may be put on the I/O thread and pushed through page cache, which may belong to one process. The data then may be sent to all other brokers or server instances and to purgatory, and the system may wait for the response to come back. For example, for a data flow on server id=1, data may be sent to servers with ids=2 to 6. Once the response is returned, the data may be put in the response queue, and transmit through the network, going through series of hops.

Figure 6:
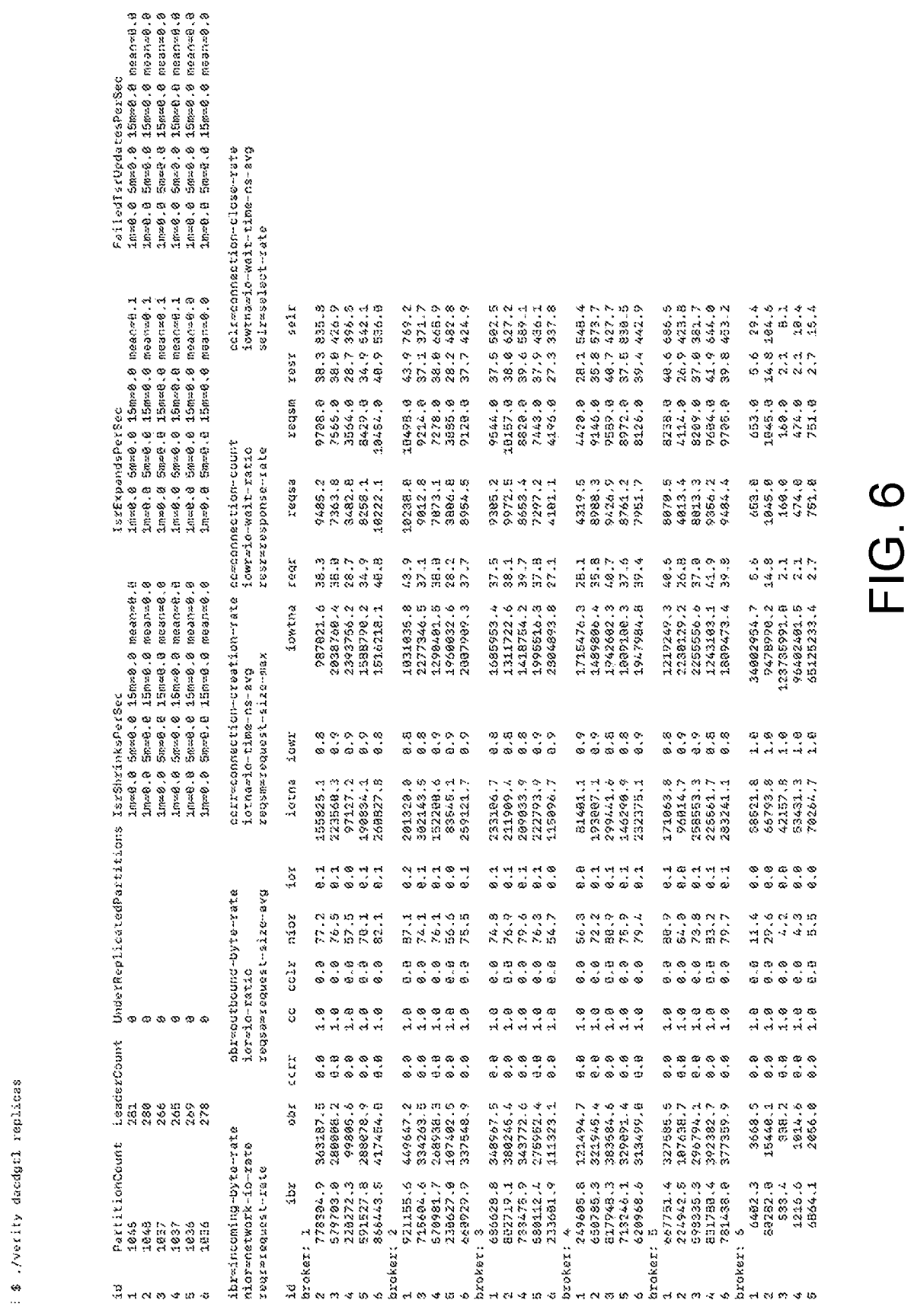

The system behavior report may display these steps from the perspective of the entire cluster, and how the cluster may perform based on all these individual steps. The verity tool may collect the metrics data, put in the series of steps, and present them in the system behavior report. In this cluster of FIG. 5, based on the parameters such as mean values of "RequestsPerSec," all six servers in the cluster seem to be operating properly. If the cluster needs to be tuned, the administrator may need to tune all server instances in the cluster. If, however, one particular server does not follow the same pattern of other servers, for example, one server may have mean=200, which is 10 times more than the "RequestsPerSec" time of other servers, this may indicate the potential issues with the server. In another example, if there is potential network issue, there may be indications of delay sending data from one broker to the other. As such, the verity tool may collect data periodically, compare the data to the previous versions to identify potential issues in the cluster, FIG. 6 shows an example real-time system behavior report according to one or more aspects of the disclosure. As illustrated in FIG. 6, an administrator may run a command "./verity dacdgt1 replicas" to generate this report for system wide behaviors on data replication, where "dacdgt1" and "replicas" may be the names of the domain and the service, respectively. The screen shot shows that for this particular service, that may have six servers, as indicated by the first column id 1-6 in the table. For example, these six servers may be discovered by the verity tool using server tags associated with the service and domain.

In a variety of embodiments, the verity tool may collect metrics data related to system resource, java-based application, java JMX statistics, or OS-level statistics. The verity tool may identify the controllers among the server instances for a service type. For example, Kafka, Zookeeper, connect and schema may need a controller for each service which may server as the primary server instances. Controllers may perform specific jobs to get statistics on each individual server instance. A Kafka controller may connect to a replicator and a schema orchestra. To determine whether a replica stays synchronized with the primary partition, the verity tool may look at the fetcher stat to see what fetchers are doing, and whether they are synchronized. Metrics data may be collected at various stages that data comes to rest, from network interface into the buffers, data sent to all replicas spread across the whole cluster, when the acknowledgements come back, and the data sent to page cache got flushed to disk, then it got committed and an offset may be committed. The report in FIG. 6 provides a view that can show how many milliseconds each server spending at each of these particular points. In aggregation, the report may show how much time each server spends at certain steps, indicating this service may be heavily utilized on the network obtaining a page cache, or when data is being sent across network and get a response back. In the example of FIG. 6, the IBR (incoming-byte-rate) for broker is significant lower than the other 5 brokers, and the administrator may investigate whether there may be a potential replication lagging issue with broker 5.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   determining a first set of producers and consumers associated with a first availability zone of a service in a service domain, wherein the service is across a plurality of availability zones;
   determining a second set of producers and consumers associated with a second availability zone of the service in the service domain, wherein data content associated with real-time data movement is replicated across the first availability zone and the second availability zone;
   tracking metric data of the real-time data movement between the first set of producers and consumers and the second set of producers and consumers; and
   presenting, based on the metric data, an aggregated real-time system behavior report for the service across the plurality of availability zones.

2. The computer-implemented method of claim 1, further comprising:
   generating a plurality of tags corresponding to a plurality of server instances for the service; and
   discovering, based on the plurality of tags, service connection details associated with the service.

3. The computer-implemented method of claim 1, wherein tracking the metric data further comprises:
   tracking time metric data that the first set of producers and consumers and the second set of producers and consumers spent moving data through queues and interfaces.

4. The computer-implemented method of claim 1, wherein the service domain comprises mirror systems across the plurality of availability zones and the data content is replicated among the mirror systems across the plurality of availability zones.

5. The computer-implemented method of claim 1, wherein the aggregated real-time system behavior report comprise real-time system behavior associated with mirror systems across the plurality of availability zones.

6. The computer-implemented method of claim 1, wherein providing the aggregated real-time system behavior report comprises:
   collecting raw metric data of a collection of attributes and properties corresponding to a plurality of server instances associated with the service; and
   filtering out the collected raw metric data based on the plurality of server instances and a type of the service domain.

7. The computer-implemented method of claim 1, wherein providing the aggregated real-time system behavior report comprises:
   collecting raw metric data of a collection of attributes and properties corresponding to a plurality of server instances associated with the service; and
   filtering out the collected raw metric data based on a role, wherein the role comprises a replicator, a central service managers and a schema registry.

8. The computer-implemented method of claim 1, wherein the service domain corresponds to a Java Management Extension (JMX) domain and wherein the aggregated real-time system behavior report comprises information on operating system level JMX metrics.

9. The computer-implemented method of claim 1, wherein tracking the metric data comprises:
   determining one or more brokers associated with the service; and
   collecting statistics on real-time data movement associated with the one or more brokers and data channels that the one or more brokers write data to achieve parallelism.

10. A computing device comprising:
    one or more processors; and
    memory storing instructions that, when executed by the one or more processors, cause the computing device to:
       generate a plurality of tags corresponding to a plurality of server instances for a service in a service domain, wherein the service is across a plurality of availability zones;
       discover, based on the plurality of tags, service connection details associated with the service;
       determine, based on the service connection details, a first set of producers and consumers associated with a first availability zone of the service;
       determine, based on the service connection details, a second set of producers and consumers associated with a second availability zone of the service, wherein data content associated with real-time data movement is replicated across the first availability zone and the second availability zone;
       track metric data of the real-time data movement between the first set of producers and consumers and the second set of producers and consumers; and
       present, based on the metric data, an aggregated real-time system behavior report for the service across the plurality of availability zones.

11. The computing device of claim 10, wherein the instructions, when executed by the one or more processors, cause the computing device to track time metric data that the first set of producers and consumers and the second set of producers and consumers spent moving data through queues and interfaces.

12. The computing device of claim 10, wherein the instructions, when executed by the one or more processors, cause the computing device to:
    collect raw metric data of a collection of attributes and properties corresponding to the plurality of server instances associated with the service; and
    filter out the collected raw metric data based on the plurality of server instances and a type of the service domain.

13. The computing device of claim 10, wherein the instructions, when executed by the one or more processors, cause the computing device to:

collect raw metric data of a collection of attributes and properties corresponding to the plurality of server instances associated with the service; and filter out the collected raw metric data based on a role, wherein the role comprises a replicator, a central service managers and a schema registry.

14. The computing device of claim 10, wherein the service domain comprises mirror systems across the plurality of availability zones and the data content is replicated among the mirror systems across the plurality of availability zones.

15. The computing device of claim 10, wherein the aggregated real-time system behavior report comprise real-time system behavior associated with mirror systems across the plurality of availability zones.

16. The computing device of claim 10, wherein the service domain corresponds to a Java Management Extension (JMX) domain and the aggregated real-time system behavior report comprises information on operating system level JMX metrics.

17. The computing device of claim 10, wherein the instructions, when executed by the one or more processors, cause the computing device to:

determine one or more brokers associated with the service; and collect statistics on real-time data movement for the one or more brokers and data channels that the one or more brokers write data to achieve parallelism.

18. One or more non-transitory medium storing instructions that, when executed by one or more processors, cause the one or more processors to perform steps comprising:

determining a first set of producers and consumers associated with a first availability zone of a service in a service domain, wherein the service is across a plurality of availability zones;

determining a second set of producers and consumers associated with a second availability zone of the service in the service domain, wherein data content associated with real-time data movement is replicated across the first availability zone and the second availability zone;

determining one or more brokers associated with the service across the plurality of availability zones;

tracking metric data of the real-time data movement between the first set of producers and consumers and the second set of producers and consumers;

collecting statistics on the real-time data movement associated with one or more brokers and data channels that the one or more brokers write data to achieve parallelism; and presenting, based on the metric data and collected statistics, an aggregated real-time system behavior report for the service across the plurality of availability zones.

19. The non-transitory medium of claim 18, wherein the instructions, when executed by the one or more processors, cause the one or more processors to perform steps comprising:

collecting raw metric data of a collection of attributes and properties corresponding to a plurality of server instances associated with the service; and filtering out the collected raw metric data based on the plurality of server instances and a type of the service domain.

20. The non-transitory medium of claim 18, wherein the instructions, when executed by the one or more processors, cause the one or more processors to perform steps comprising:

collecting raw metric data of a collection of attributes and properties corresponding to a plurality of server instances associated with the service; and filtering out the collected raw metric data based on a role, wherein the role comprises a replicator, a central service managers and a schema registry.

\* \* \* \* \*